United States Patent Office 2,903,333
Patented Sept. 8, 1959

2,903,333

RARE EARTH-ACTINIDE SEPARATION BY ADSORPTION

Charles S. Lowe, Germantown, Ohio, and William H. McVey, Berkeley, Calif., assignors to the United States of America as represented by the United States Atomic Energy Commission No Drawing. Application July 18, 1951
Serial No. 237,482

1 Claim. (Cl. 23—14.5)

The present invention pertains to a method of separating those fission product values normally contained in solutions of neutron-irradiated uranium, and more particularly a method for selectively separating zirconium and niobium metal values from actinide elements having a hexavalent state, such as uranium and plutonium, present in aqueous solutions.

It is now known that a number of elements are formed by neutron bombardment of natural uranium in a neutronic reactor. By neutron absorption $U^{238}$ is converted to $U^{239}$. The latter decays to $Np^{239}$, which decays to $Pu^{239}$. These transuranic elements are formed in amounts of the order usually considerably less than 1 percent by weight of the uranium. Those elements having atomic numbers and atomic weights much lower than the transuranic metals and which are produced by neutron bombardment of $U^{235}$ followed by fission, are collectively termed fission fragments. As originally produced they are considerably overmassed and undercharged so that they are highly unstable. By means of beta radiation they quickly transform themselves to isotopes of other elements having longer half-lives. These fission fragments, together with the products of their decay, are collectively termed fission products. These radioactive elements are divided into two groups: the radioactive isotopes of elements having atomic numbers between 35 and 46, with strontium, yttrium, zirconium, niobium, and ruthenium constituting the principal members of the light element group and the radioactive isotopes of elements having atomic numbers between 51 and 60, with tellurium, cesium, iodine, barium, lanthanum, cerium, and praseodymium comprising the principal members. The total yield of fission product elements from neutron bombardment of natural uranium is of substantially the same order of magnitude as that of plutonium. In contrast to the alpha decay of $Pu^{239}$, the fission products are chiefly beta and gamma emitters. The term "gamma decontamination" therefore denotes the extent of removal of the aforementioned fission product values.

The fission product elements, niobium and zirconium, are two of the more troublesome fission product contaminants encountered in the course of isolating plutonium and in purifying uranium after separation from plutonium and the bulk of the fission products. Removal of zirconium and niobium values is therefore a major objective in processes for recovery and decontamination of uranium and/or plutonium. Since as much as 30 to 40 percent of the total gamma radiation emanating from neutron-irradiated uranium mixtures, even after two to three months of aging, is attributable to the presence of niobium and zirconium, the value and utility of the process of the instant invention is obvious.

It is therefore an object of the present invention to provide a method of separation of zirconium and/or niobium values from aqueous solutions of fission products.

A further object of the present invention is to provide a method for separation of zirconium and/or niobium values from aqueous solutions containing said values and plutonium, uranium, or plutonium and uranium.

It is a further object of this invention to provide a method for the separation of zirconium and/or niobium from aqueous solutions of neutron-irradiated uranium containing plutonium and the fission products.

It is a further object of this invention to provide a method for at least partial removal of zirconium from a solution of neutron-irradiated uranium whereby any zirconium fraction not removed by the process of the instant invention is so conditioned that it is readily separable from plutonium during subsequent processes commonly employed for isolation of plutonium from neutron-irradiated uranium.

Other objects and advantages will be apparent upon the further examination of this specification.

We have discovered that zirconium and niobium values are removed from aqueous solutions containing their salts and salts of actinides in at least the tetravalent state by a process which comprises contacting the aqueous solution with an adsorbent glass material so as to adsorb zirconium and niobium values thereon and thereafter separating the treated solution and the glass containing the adsorbed metal values. Suitable adsorbent glass compositions for this purpose are those which have a high silica content, preferably at least 96 percent silica, wherein the remainder is chiefly boric oxide which contains only traces of arsenic and antimony, no heavy metals and from which magnesium, calcium, and zinc ions have been substantially removed.

The above-described glass composition is suitably employed as a sintered glass filter or preferably in a form of glass providing a large surface area per unit weight, such as Pyrex or soft glass wool and porous glass reduced to powder form having a particle size varying from about 50 to 150 mesh. A suitable form of powdered glass for the purposes of this invention is a product known commercially as "Vycor" brand glass powder which is a leached borosilicate glass which has not been collapsed by heating. Vycor brand glass is manufactured by Corning Glass Works by heating an alkali borosilicate glass to cause the development of two phases and treating such glass with an acid to leach out one of such phases. The process of making Vycor brand glass is described in U.S. Patent No. 2,215,039, granted to H. P. Hood et al. on September 17, 1940, and also in the J. Am. Ceram. Soc. 27, 299–305 (1944).

Given a comparable surface area for adsorption of zirconium and niobium there is no substantial difference between the adsorptive capacity of soft glass and glass having a low coefficient of expansion. However, we have discovered that pretreatment of glass wool or porous glass powder prior to its use as an adsorbent for zirconium and niobium values improves the adsorptive capacity. This preferred pretreatment comprises soaking the glass for about two hours in a two-percent sodium silicate solution, rinsing and drying at room temperature.

The aqueous solution from which the metal values are selectively adsorbed on glass contains a strong inorganic mineral acid, such as nitric acid, hydrochloric acid, or sulfuric acid, in sufficient amount to effect therein a pH between —0.5 and 2 and preferably between 0 and 1.5. A pH of about 0.5 is optimum for adsorption of these particular metal values from aqueous solutions. A wide range of temperature of the solution, including room temperature, can be used. The solution is preferably held at about 90° to 100° C. during contact with the glass adsorbent. Maximum adsorption of metal values is attained within the first 5 to 20 minutes of contact. By maintaining the aqueous solutions at moderately elevated temperatures during the initial period of contact with glass, adsorption is increased by between 10 and 40 percent. Use of glass adsorbent, therefore, has a definite advantage over other types of adsorbent owing to the nonsolubility of glass in the solutions even when heated.

At room temperature, successive contact of the solution with fresh adsorbent further improves the cumulative Zr and Nb decontamination of the solutions, but only to a somewhat lesser extent than the improvement obtained by moderate heating of the solution during contact with glass. Approximately 80 grams of glass adsorbent per liter of solution are suitable under the above-described optimum conditions. Even at low concentrations of zirconium values and in the presence of several other types of ions, such as those occurring in normal process solutions of neutron-irradiated uranium, the adsorption on glass is a linear function of the zirconium concentrations in the acidic aqueous solution from which it is adsorbed. The quantitative relationship between the glass adsorbent and solution treated can be varied over wide limits depending upon the total quantity of metal values to be adsorbed.

An embodiment of the instant invention comprises contacting an acidic aqueous solution containing zirconium and/or niobium, as well as other fission products, and uranium and/or plutonium, with a glass surface in accordance with the previously outlined conditions so as to selectively adsorb said zirconium and niobium metal values upon the glass which is then separated from the treated solution, and the zirconium and/or niobium values adsorbed thereon are thereafter eluted from the glass by contact with a relatively concentrated strong inorganic acid, e.g., at least 5 M nitric acid, or a solution containing ions capable of forming a water-soluble complex with the glass-adsorbed zirconium values. Agents suitable for the elution of glass-adsorbed zirconium and niobium are concentrated sulfuric acid and concentrated nitric acid and preferably aqueous solutions containing the complex-forming oxalate ions, such as solutions of oxalic acid and ammonium oxalate. About two hours of agitation in the case of a 10 percent oxalic acid solution removes as much as 99.5 percent of the adsorbed zirconium values from the glass.

A further embodiment of this invention comprises combination of the instant process of glass adsorption of zirconium and niobium with the steps employed in processes for extraction, including chelation and solvent extraction for recovery of plutonium and uranium from solutions of neutron-irradiated uranium.

In accordance with this second embodiment of this invention, the aqueous uranyl nitrate solution containing a microconcentration of plutonium and tracer quantities of fission products including zirconium is adjusted to a pH of −0.5 to 2 and preferably to a pH of 0 to 1.5. This solution is then contacted with a high-silica-content glass in a form which provides a maximum surface area. In accordance with the process of the instant invention the zirconium values and other fission products are selectively adsorbed on the glass, which is then separated from solution. The acidity of the separated solution is thereafter adjusted, if necessary, from that used in the glass adsorption step to a nitric acid concentration of at least 0.5 M and preferably at least 1M for the solvent extraction of plutonium. A salting-out agent, such as a salt of an alkali metal, or an alkaline earth metal, or an ammonium salt and having a common ion with respect to the actinide metal salt to be extracted, is added to the aqueous solution to effect a concentration of at least 3 M. The resultant solution is contacted with the organic solvent such as methyl isobutyl ketone. Phases are separated and the organic solvent contains uranyl and plutonyl salts.

We have discovered that any remaining unadsorbed fraction of fission product species, particularly zirconium, remains primarily in the aqueous phase upon subsequent solvent extraction of uranium and plutonium.

The instant process for selective adsorption of Zr and Nb on glass is shown by the following examples.

Example I

A process solution of neutron-irradiated uranium containing about 52% uranyl nitrate hexahydrate, 1.5% $HNO_3$, 0.001 M $H_2SO_4$, fission products including zirconium, and about $3 \times 10^{-4}$ M plutonium as $Pu(NO_3)_4$, and having a pH of 2.02, was adjusted with $HNO_3$ to a pH of 0.2 before contacting 500 λ (microliters) of solution successively with three separate 0.5 g. portions of glass wool. Glass adsorption alone effected removal of 68.4% gross gamma activity to give a gross gamma decontamination factor of 3.2. Decontamination factor is the amount of activity in the initial solution divided by the amount remaining in the solution after the adsorption treatment. The zirconium decontamination factor of the solution was $1.0 \times 10^3$ and the niobium decontamination factor of the solution was 8.2. Zr and Nb constituted 25.3 and 69.7%, respectively, of the initial gamma activity.

Example II

A solution of neutron-irradiated uranium which contained in aqueous solution about 27.3% uranyl nitrate hexahydrate, 0.8% $HNO_3$, about 4.4% $H_2SO_4$, less than 0.8% $NaNO_2$, 0.005% plutonium as $Pu(NO_3)_4$, and fission products including zirconium in microconcentrations was contacted with glass wool and separated therefrom by centrifugation. Upon elution of the glass wool adsorbent material with concentrated nitric acid, the resultant nitric acid eluate showed Zr contaminated with other fission product activities. The eluate was then extracted with 2-thenoyltrifluoroacetone in benzene and the beta absorption curve of the extracted product was identical with the beta absorption curve for zirconium. The ratio of the beta to alpha activity in the final solution of the zirconium was $1.3 \times 10^5$ indicating adequate separation from plutonium.

Example III

Portions, each 0.5 ml., of an aqueous niobium-free and carrier-free zirconium tracer solution after adjustment of acidity were transferred each to a 0.1-gram bed of Pyrex glass wool providing a surface area of approximately 1500 cm.$^2$ per gram, said glass being contained in a glass centrifuge cone coated with an organic plastic material. After thirty minutes of contact with the glass wool, the tracer solutions were centrifuged off. The following data show the effect of acidity upon glass adsorption of zirconium values.

| Solutions: | Percent Zr activity removed |
|---|---|
| 6.67 M in $HNO_3$ | 1.1 |
| 3.34 M in $HNO_3$ | 4.2 |
| 2.22 M in $HNO_3$ | 5.8 |
| 1.11 M in $HNO_3$ | 13.6 |
| 0.67 M in $HNO_3$ | 31.0 |
| 0.30 M in $HNO_3$ | 85.0 |

Attempts were made to adsorb more zirconium activity by lowering the acidity still further, with the following results which show zirconium adsorption to be maximum from about 0.3 M $HNO_3$.

| Solutions: | Percent Zr activity removed |
|---|---|
| 0.33 M in $HNO_3$ | 73.7 |
| 0.22 M in $HNO_3$ | 83.2 |
| 0.17 M in $HNO_3$ | 82.2 |
| 0.11 M in $HNO_3$ | 77.0 |
| 0.083 M in $HNO_3$ | 75.5 |
| 0.033 M in $HNO_3$ | 73.8 |

Example IV

Another quantity of a tracer solution of zirconium salt, from which niobium had been separated by extraction of Zr with 2-thenoyltrifluoroacetone and re-extraction, was made 1 M in nitric acid and was treated with about 0.5 gram of glass wool providing about 750 cm.$^2$ surface area. The glass wool had been placed in a centrifuge tube coated with an organic plastic to minimize adsorption on the glass container. Seventy-five percent of the zirconium was adsorbed within ten minutes and no adsorption took place during the remainder of a total period of one hour. Over 98% of the zirconium activity was adsorbed within five minutes from a zirconium tracer solution 0.3 M in nitric acid.

*Example V*

A solution made from neutron-irradiated uranium and containing about 25% uranyl nitrate hexahydrate was diluted eight-fold to bring the pH to about 1.3 and successively contacted with three different packs of glass wool. The zirconium data shown below were obtained by the BaZrF$_6$ method.

| | Original Solution | First Contact | Second Contact | Third Contact |
|---|---|---|---|---|
| Percent original gross gamma count remaining | 100 | 17.7 | 14.4 | 12.9 |
| Percent remaining gamma count due to zirconium | 28.4 | 2.67 | 0.59 | 0.17 |
| Zirconium decontamination factor | | 60 | 341 | 1.3×10$^3$ |

Removal of as much as 86.9% gross gamma activity indicates adsorption of other fission products.

*Example VI*

A solution of neutron-irradiated uranium, like that used in Example V but undiluted, was adjusted to a pH of 0.48 with concentrated NH$_4$OH. It contained about 25% uranyl nitrate hexahydrate, 0.8% nitric acid, 4.4% sulfuric acid, about 0.005% Pu (IV) nitrate and microconcentrations of fission products prior to the addition of NH$_4$OH. The extent of adsorption on glass is shown below:

| | Original Solution | First Contact | Second Contact | Third Contact |
|---|---|---|---|---|
| Percent original gross activity removed | | 79.4 | 5.1 | 1.3 |
| Percent total count due to Zr (BaZrF$_6$ analysis) | 35.0 | 7.6 | 1.8 | 0.10 |
| Percent total count due to Nb (Nb$_2$O$_5$ method) | 62.2 | 28.9 | 12.4 | 10.6 |
| Zr removal factor | | 22 | 125 | 2.5×10$^3$ |
| Nb removal factor | | 10 | 32 | 41 |

The preceding data show considerable adsorption of niobium as well as of zirconium. After two hours' agitation in contact with a 10% solution of oxalic acid, 99.5% of the adsorbed activity was removed from the glass wool.

*Example VII*

An aqueous solution containing a microconcentration of plutonium, tracer concentrations of some fission products, and being 0.05 M in ferrous sulfamate, 0.2 M in HNO$_3$ and 1.3 M in Al(NO$_3$)$_3$ had its ruthenium activity substantially removed by ozonization. The solution having a pH of 0.25 was contacted for one hour at 100° C. with 100-g. portions of porous (48 to 80 mesh) Vycor per liter of solution treated. It was found that 96.2% of the gross gamma activity, 92.1% of the zirconium values, and only 0.45% of the plutonium were adsorbed. No holding oxidants were employed during this adsorption study and the nonadsorption of plutonium under these conditions is worthy of note.

*Example VIII*

Fresh (two-day old) dissolver solution having a composition of about 52% uranyl nitrate hexahydrate, about 1.5% HNO$_3$, 46.5% water, about 0.01% Pu (IV), about 0.01% fission products including zirconium, and a pH of about 0.1 after making the solution 0.1 M in Na$_2$Cr$_2$O$_7$, was successively contacted at 100° C. three times with samples of fresh Vycor, using 80 g. of Vycor per liter of solution for each contact. The results are indicated below:

| Successive Contacts | Cumulative Gross Gamma Removed (Percent) | Cumulative Zirconium Removed (Percent) |
|---|---|---|
| 1 | 52.8 | 82.2 |
| 2 | 64.2 | 94.7 |
| 3 | 67.3 | 97.4 |

Plutonium was not adsorbed by the Vycor. The dichromate had oxidized plutonium so that it was about 48% Pu (IV) and 52% Pu (VI).

The extent of gross decontamination and particularly with respect to zirconium from treated process solutions of neutron-irradiated uranium depends somewhat upon the age of the solution and the consequent zirconium and fission product concentration therein.

*Example IX*

A 70-day sample of an aqueous solution of neutron-irradiated uranium, containing about 27.3% UNH, 0.8% HNO$_3$, 4% H$_2$SO$_4$, 0.8% NaNO$_2$, about 0.005% plutonium as Pu(NO$_3$)$_4$, and microconcentrations of fission products of which about 31.5% activity was zirconium, was adjusted to a pH of about 1, and four aliquots were contacted each with three different portions of fresh glass wool. The data are as follows:

| Successive Contacts | Glass Wool [1] (g./l.) | Cumulative Gross Gamma Removal (Percent) | Cumulative Zirconium Removal (Percent) |
|---|---|---|---|
| 1 | 50 | 9.8 | 37.9 |
| 2 | 50 | 46.0 | 51.0 |
| 3 | 50 | 48.5 | 71.8 |
| 1 | 125 | 51.2 | 49.3 |
| 2 | 125 | 76.6 | 75.6 |
| 3 | 125 | 83.2 | 88.7 |
| 1 | 150 | 62.3 | 55.6 |
| 2 | 150 | 80.1 | 82.2 |
| 3 | 150 | 83.4 | 95.0 |
| 1 | 175 | 78.5 | 59.8 |
| 2 | 175 | 81.0 | 85.6 |
| 3 | 175 | 85.8 | 99.9 |

[1] Pyrex glass wool, soaked in 2% sodium silicate ca. two hours, rinsed and dried at room temperature. Previous results had indicated greater adsorption obtained by this treatment.

*Example X*

A dissolver solution containing about 52% uranyl nitrate hexahydrate, 1.5% HNO$_3$, 46.5% water, 0.01% Pu(NO$_3$)$_4$ and microconcentrations of fission product values including zirconium was ozonized for removal of 99% of the ruthenium oxidation of plutonium to Pu (VI). This solution and a similar solution, which was made 0.1 M in sodium dichromate to hold plutonium in the hexavalent state, were treated one hour at 100° C. using 100 g. of 48–80 mesh porous Vycor per liter of solution. The pH of the solutions was 0.1.

| Age of Solution | Na$_2$Cr$_2$O$_7$ (M) | Percent Adsorbed | | |
|---|---|---|---|---|
| | | γ | Zr | Pu |
| 13 days | 0 | 76.3 | 94.1 | 0.7 |
| 21 days | 0.1 | 41.8 | [1] 68 | [1] 0.06 |

[1] Following the rinse, adsorber heated 30 minutes at 100° C. in 2.3 M UNH and centrifuged removing 1.2% Zr and 0.05% Pu.

In the first experiment the adsorber was rinsed three times with water after adsorption; in the second experiment the adsorber was rinsed three times with 0.01 M HNO$_3$ after adsorption.

Example XI

Dissolver solution having a pH of 1.2, aged four days, containing about 52% uranyl nitrate hexahydrate, 1.5% $HNO_3$, 46.5% $H_2O$, 0.01% tetravalent plutonium nitrate and microconcentrations of fission product values including zirconium, was adjusted to a pH of 0.0 to 0.1 and made 0.1 M in $Na_2CR_2O_7$. After standing 24 hours at room temperature, plutonium had oxidized so that it was 48% tetravalent plutonium and 52% in the hexavalent state. The solution was contacted for one hour at 100° C. with porous Vycor using 3 mg. of Vycor per 50 λ (60 g. of Vycor per liter). The mixture was centrifuged, the Vycor was washed three times, each with 250 λ of 0.1 M nitric acid, and the washes were combined. The combined washes and centrifugate from the dissolving solution were analyzed for plutonium, gamma activity, and zirconium. In addition, the Vycor was analyzed for plutonium. The results are tabulated below. It was estimated that the hold-up centrifugate on the Vycor was about 4–5%. The following data show that plutonium is substantially non-adsorbed in carrying out this process for removal of zirconium.

| Material Analyzed | Pu, Percent | γ Activity, Percent | Zr, Percent |
|---|---|---|---|
| Centrifugate | 96.1 | 52.2 | 22.0 |
| Washes | 4.8 | 3.5 | 3.05 |
| Powder | 0.005 | | |

While the foregoing examples show the adsorption of zirconium and niobium from aqueous solutions also containing plutonium whereby a separation of zirconium and niobium from plutonium is obtained, the aqueous solutions also contained uranyl salt and the separation of zirconium and niobium from uranium was also satisfactory.

Obviously, the instant process for glass adsorption of zirconium and niobium from aqueous solutions can be employed in combination with and at any stage prior or subsequent to the aforementioned extraction processes for recovery of the actinide metal values. In addition thereto, the process of the instant invention may be used for separation of zirconium and niobium values from aqueous solutions other than those derived directly from neutron-irradiated uranium, such as relatively concentrated solutions of zirconium and niobium. The instant process is particularly useful in the treatment of waste liquors from which it is desired to recover uranium as well as zirconium values, which latter metal causes substantial interference in processes for recovery of uranium from wastes.

The scope of the instant invention is therefore to be limited only as indicated by the following claim.

What is claimed is:

A process for separating an element having an atomic number of at least 40 and a maximum atomic number of 41 from a mixture comprising said element and an actinide element capable of being in the hexavalent state in an aqueous solution, which comprises contacting an aqueous solution having a pH from −0.5 to 2 and containing said element and said actinide element, the latter being in at least the tetravalent state, with noncollapsed leached borosilicate glass powder, separating the aqueous solution containing the actinide metal and glass having adsorbed thereon the element having an atomic number of at least 40 and a maximum atomic number of 41, contacting the glass with nitric acid having a concentration of at least 5 M, and separating the glass and the nitric acid solution containing the element having an atomic number of at least 40 and a maximum atomic number of 41.

References Cited in the file of this patent

Coryell et al.: "Radiochemical Studies: The Fission Products," Book 3, pages 1532–1535 (1951); paper by Siegel et al., publ. by McGraw-Hill Book Co., Inc. New York, N.Y.

Horovitz et al.: "Chemical Abstracts," vol. 21, p. 3299 (1927).

Lengyel et al.: "Chemical Abstracts," vol. 35, p. 6405 (1941).

Mellor: "Comprehensive Treatise of Inorganic and Theoretical Chemistry," vol. 6, pp. 320, 321, 521–524 (1947); publ. by Longmans, Green & Co., London.

Schubert: "The Use of Ion Exchangers for the Determination of Physical-Chemical Properties of Substances, Particularly Radiotracers, in Solution," III. AECD–2813, Mar. 28, 1950. Publ. by U.S. Atomic Energy Commission.